United States Patent [19]
Way

[11] 3,747,255
[45] July 24, 1973

[54] FISHING REEL APPARATUS
[76] Inventor: Merton B. Way, 5300 John R. Rd., Troy, Mich.
[22] Filed: Aug. 10, 1970
[21] Appl. No.: 62,592

[52] U.S. Cl. .............................................. 43/27.4
[51] Int. Cl. ............................................ A01k 91/00
[58] Field of Search ....................... 43/18, 21.2, 22, 43/27.4

[56] References Cited
UNITED STATES PATENTS
2,261,629   11/1941   Murphy ................................ 43/18

Primary Examiner—Louis G. Mancene
Attorney—Gerald R. Hershberger

[57] ABSTRACT

A large size, light weight fishing reel for deep water fishing having inproved features. The conventional frame around the reel spool has been eliminated and a right angle spool mounting support substituted which has a spindle for rotation of the spool thereon. A drag mechanism is provided at the end of the spindle to regulate the drag on the line. The spool is made in halves to facilitate manufacture, and the halves secured together by rivets or other means. The base of the reel mounting support is provided with interchangeable mounting seats so that the reel may be used with a fishing pole, or mounted on a boat or other support. The device is preferably constructed of cast aluminum, but other light weight materials such as plastic may be used and the spool injection molded.

The device further includes a combination mounting means and fishing pole structure which permits indexing of the fishing pole to pre-selected position, and ready mounting and demounting of the spool and pole for attaching and removing such from the spool mounting support.

1 Claim, 11 Drawing Figures

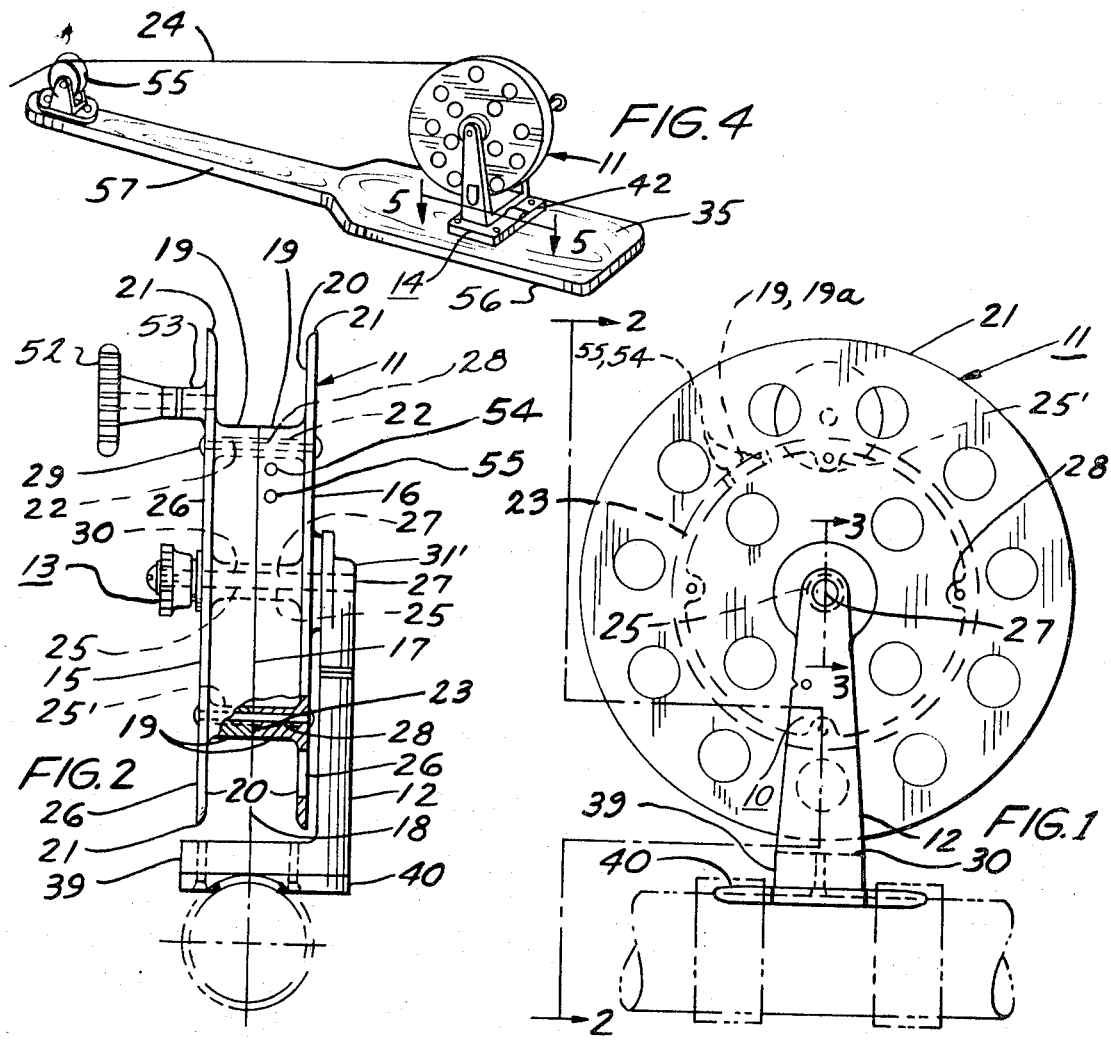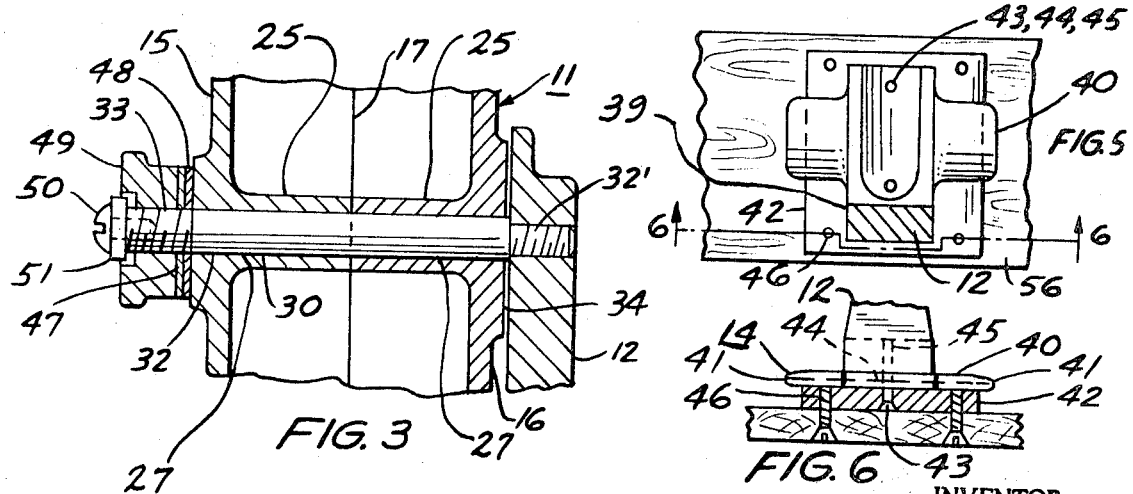

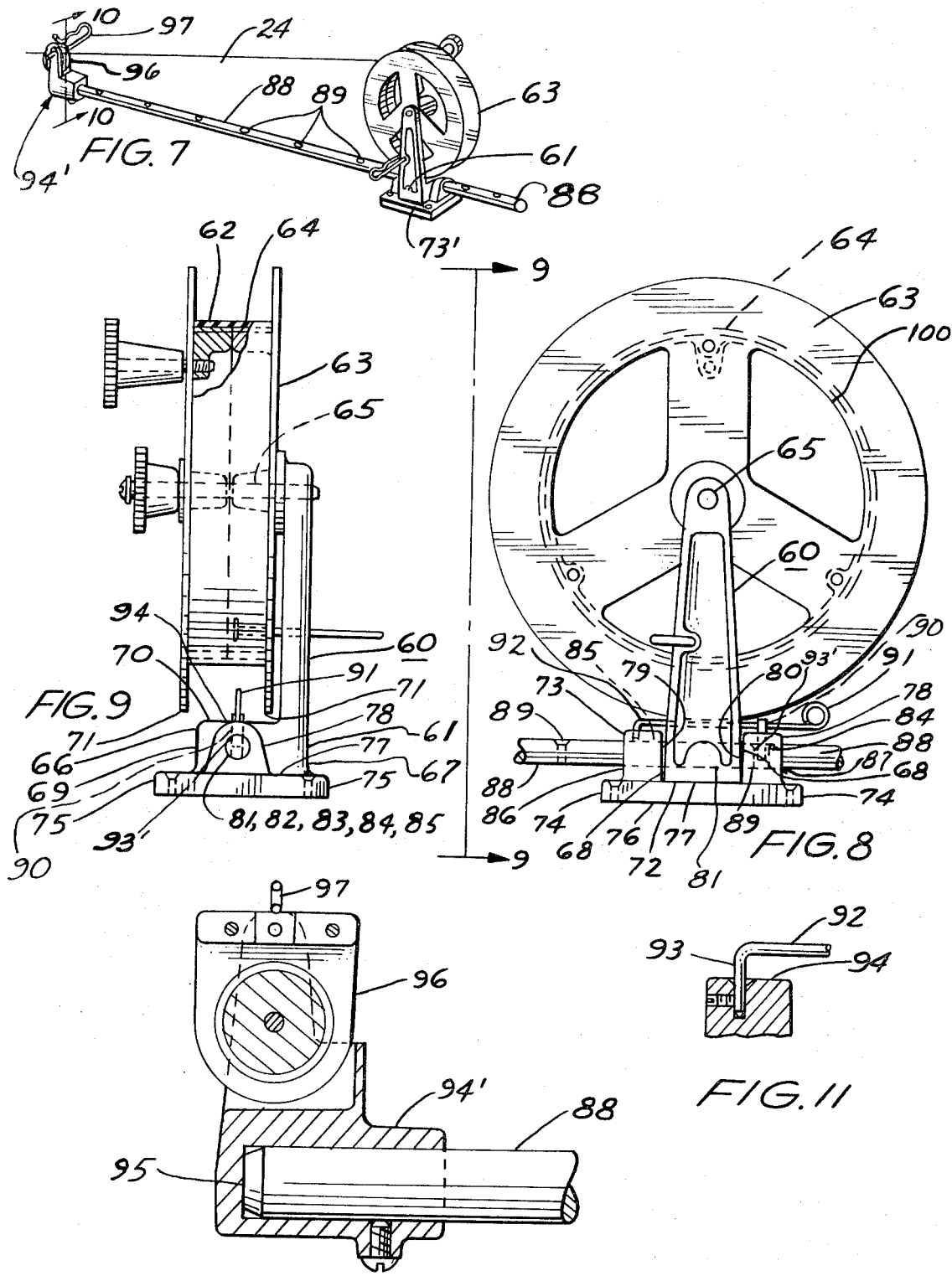

FISHING REEL APPARATUS

BACKGROUND OF THE INVENTION

1. Field of the Invention

This invention relates to fishing reels and more particularly to fishing reel spool construction and fishing reel mountings for fishing reels used for deep water fishing. The reel may be used on a fishing pole or mounted directly to a boat or other support.

Also in the prior art, the attachment of the spool to the reel mounting support is generally primitive, and provisions for indexing of the fishing rod proper for convenience in avoiding breakage thereof, generally has not been made.

2. Description of the prior art

As is well known to persons skilled in the art, fishing reels of various types have been provided for use in deep water fishing. For the most part, the deep water fishing reels offered before this invention are unwieldly for their size, and difficult to construct, with flimsy spool to spindle mounting provisions. Further, in general, the prior fishing reel spools have inadequate capacity for holding line in comparison with their size and weight. Likewise, provision has not been made in the prior art for dual mounting of the reel for either fishing pole use or stationary mounted use.

SUMMARY OF THE INVENTION

The present invention overcomes the above mentioned deficiencies of the prior art and in so doing provides the fisherman with a light weight, large sized fishing reel having a minumum of working parts, and a large, light weight two-piece spool construction, which is adapted to be manufactured from relatively inexpensive molds. The provisions for mounting of my reel is improved in that the reel has a specially constructed fishing rod reel mount which is specially constructed and detachable from the reel, and in addition, a detachable reel mounting plate is provided which is coordinated with the fishing rod mount, to permit mounting of the reel proper to a generally flat surface by screws or other suitable clamping means. The improved spool support is of sturdy molded construction and has provisions for attaching the fishing rod reel mount and the reel mounting plate to the base portion thereof.

Further, the present invention provides fishermen with an advanced fastening device for readily and quickly attaching and detaching the rod and spool from the reel mounting support, and with indexing stops to locate the rod in any desired position for deep water down-rigger trolling, and to retract the rod when the boat is being docked. A line pop-off proof rod tip is also provided on my device.

BRIEF DESCRIPTION OF THE DRAWING

FIG. 1 is an elevational view of a fishing reel constructed in accordance with my invention.

FIG. 2 is a side elevational view taken in direction of line 2—2 of FIG. 1.

FIG. 3 is a cross-sectional view of the spindle construction some-what enlarged from that of FIG. 1, taken in direction of line 3—3 of FIG. 1.

FIG. 4 is a pictorial view of my invention.

FIG. 5 is a cross-sectional plan view of the reel seat structure taken in direction of line 5—5 of FIG. 4.

FIG. 6 is a cross-sectional view of the combination reel seat mounting structure taken in direction of line 6—6 of FIG. 5.

FIG. 7 is a perspective view of my modified version of a down-rigger fishing reel and pole device as assembled ready for attachment to a suitable place on a boat.

FIG. 8 is an elevational view showing the features of my combination detachable indexing fishing rod, and detachable spool.

FIG. 9 is a side elevational view taken on line 9—9 of FIG. 8.

FIG. 10 is an enlarged view of my improved rod tip structure.

FIG. 11 is an enlarged view of the means for securing the indexing pin to the pillow block-like structure.

DETAILED DESCRIPTION OF THE INVENTION

Referring now in detail to the drawing and in particular to FIGS. 1, 2, and 3, the numeral 10 denotes a fishing reel constructed in accordance with my invention, and including a spool unit denoted generally by the numeral 11, a spool support denoted generally by the numeral 12, a generally conventional drag mechanism denoted generally by the numeral 13, and a combination reel mounting unit denoted generally by the numeral 14. In my invention the reel spool is of special form and includes two generally interchangeable body half portions 15–16 of substantially the same hand, with the joint line 17 thereof occurring generally at the center 18 of said spool when said halves are assembled together. The spool half portions 15 and 16 each include a registering fishing line retaining cantilevered, generally cylindrical symnetrical wall 19, which joins walls defining annular, apertured, disk-like, circular, generally vertical, inner supporting wall 20. The supporting wall 20 terminates at peripheral circular rim 21, generally concentric with said wall 19, and the substantial radial space between the rim 21 and said cantilevered wall 19 provides ample L-shaped storage for accumulation of the fishing line as the spool is rotated. The supporting wall 20 is continued in apertured manner vertically from inner lateral wall 22, which wall 22 lies concentric with and adjacent to outer lateral cylindrical wall 19, forming a thin annular lateral rim-like joint portion or face 23, lying parallel with wall 20. The joint face 23 of said half portions and lateral walls 19 register with each other when assembled so that the joint 17 between them is tight, and the fishing line 24 cannot slide between them. Outside generally flat, circular, vertical wall 26 is formed to join with disk-like wall 20 at rim 21 defining said spool body halves 15 and 16 to be of generally thin webb-like cross-section. A matching axial bore 27 is provided centrally in each of boss-like, cantilevered, spindle bearing members 25. The lateral rim or face 23 is provided with registering sector-like bosses 25', having oppositely disposed raial bores 28 extending completely through each of said spool halves normal to wall 26, and said halves are then secured fixedly together by rivets 29 or other suitable means through bores 28 to form the integral structure of spool unit 11. Said spool unit 11 is rotatably attached to a horizontal spindle means 30 extending in cantilever fashion from spool support 31, one end of said spindle means is fixedly fastened by knecked down threaded portion 32' to spool upper arm 31' at right angles to said arm. The spindle axle portion 32 is inserted in said axial bores 27 to journal said spool unit 11. A threaded portion 33 of said spindle axle portion extends outwardly of said spool unit to attach said drag mechanism thereto. A boss-like protuberance 34 formed on spool half 16, engages said upper arm to provide bearing surface for rotating said spool unit. A key or pin 36 is inserted in a bore 37 in said upper arm and is movable inwardly towards said spool to engage the apertures 38 in said spool unit 11 to provide positive stoppage of rotation in certain cases where heavy sinkers are in use.

The base of the spool support 12, as shown in FIGS. 5 and 6, is provided with an angular pedestal 39 extending under said spool unit rim and to which is attached my combination reel seat unit 14. My reel seat unit 14 is comprised of a removable, generally T-shaped outlined fishing pole adapter member 40 with the crossbar-like portions of the "T" providing tangs 41, oppositely positioned at right angles to said pedestal and extending outwardly therefrom for attaching to a fishing pole, and a mounting member 42 of generally rectangular outline with the periphery thereof extending generally outside the periphery of said adapter member, and said mounting plate members 42 are mounted to said angular pedestal by screws 43 which are inserted through registering bores 44 in said fishing pole adapter member and said mounting plate member and threaded into internally threaded holes 45 in said pedestal. The mounting plate member 42 has generally rectangularly spaced additional mounting bores 46 for mounting my fishing reel to a flat surface such as topside or stern of a boat or an outrigger 35. When it is desired to use my reel on a fishing pole, said mounting plate member is removed and said fishing pole adapter member is attached directly to said pedestal by said screws. The drag mechanism is of conventional design and includes opposed frictional washers 47 and 48, a thumb nut 49 is threaded on the threaded portion 33 of said spindle. A screw 50 and washer 51 retain said nut on said spindle. Tightening of the nut exerts frictional force on said spool unit between said spool support upper arm and said frictional washers, one of which is prevented from turning, registering resistance to rotation of said spool unit proportional to the degree said nut is tightened. Bores 54 and 55 are provided through annular walls 19 and 22 to secure the fishing line 24.

A handle 52 for turning said spool unit is provided on the spool half opposite said support arm. The boss 53 for said arm may be made in the mold by use of a removable core (not shown) so that siad boss will not appear on the opposite half, for convenience in manufacture.

FIG. 4 shows my invention mounted on an outrigger 35 using said seat plate member mounted on the outrigger paddle-like platform 56. The outrigger 35 is provided with a pulley 55 at the handle end 57 of said platform for lowering and guiding the fishing line.

A modification of my invention id disclosed in FIGS. 7, 8, 9, and 10, of sheet numeral two of the drawings and is denoted generally by the numeral 60.

The modified version of my invention includes a combination pole indexing and fishing spool detaching means 61. The spool unit 63 is generally the same construction as spool unit 11, however, the sizes of the components thereof are considerably larger than those of the invention previously disclosed, supra, and the spool unit 63 is provided with a protective band 62 about its radial channel portion 64.

The spindle axle portion 65 of the modified version is generally the same in construction as for spindle 32, with larger aperatures 32'. The spindle lower arm portion 67 thereof is however modified, in that said lower portion has a reel spool bearing and pedestal means 66 including lateral side walls 68, a front wall 69, a top wall 70, adjacent and beneath rims 71 of said spool unit, and a bottom support wall 72 generaly parallel to said top wall. The bearing and pedestal portion or means 66 is arranged and adapted to be assembled with a reel bearing and indexing based means 73 including a generally rectangularly outlined mounting support portion 73' having end walls 74, forward and back walls 75, a bottom mounting wall 76, and a top surface wall 77. A pair of pillow block-like bearing portions 78 are formed from said top wall 77 and have upwardly turned annular faces 79 and 80 which generally abut and register with said lateral side walls 68 to removably locate said pedestal means 66 and said base means 73 with the bottom wall 72 of said pedestal means engaging the top wall 77 of said base means. A bore 81 is defined by cylindrical passage walls 82 formed normal to said lateral walls 68, and bores 83 are defined by cylindrical passage walls 84 and 85 formed normal to faces 79 and 80 and extend completely through said bearing portions 78 and connect with outside faces 86 and 87 of said pillow block-like bearing portions 78. The bores 81 and 83 register axially with each other to provide in effect, a single uniform, smooth, bore-like passage entirely through both said base means and said pedestal means. An elongated generally cylindrical fishing rod member 88, preferrably constructed of aluminum metal is operable to be slidably journaled in said bores, and operable to be extended from said base a substantial distance to serve as a fishing pole. Said pole member includes a plurality of indexing stop elements or bores 89 spaced along its length parallel and planar in relationship to each other. The fishing pole indexing means further includes a male indexing member 90 selectively engaging one of said bores 89 when said rod is extended by the fisherman to a predetermined length, said male member biased to remain engaged in said bore, unless same is released therefrom by the operator raising said male member by exerting pull upwardly on the free end 91 of a cantilevered wire spring member or means 92 to which end said male member is mounted.

The end 93 of said spring member opposite said free end is fixedly fastened to the upper surface 94 of one of said pillow block portions 78, and said spring member 92 extends in cantilevered fashion beneath said spool generally parallel thereto. A guide bore 93' is provided in upper surface 94 of the other pillow block portion 78, and said guide bore 93' registers with one of the selected pole index bores 89 as said pole is extended or retracted for use. It is readily seen, that complete removal of said pole from said pedestal means and base means by retraction of said male member allows the spool unit 63 to be removed entirely from said base means, however the base means may remain in its support, and the pole re-inserted in said pedestal means for storage.

A special rod tip base portion 94' is fixedly mounted axially to end 95 of said pole member, and is provided with a closed annular surface or pulley portion 96 for supporting the fishing line 24. A spring clip member 97 secures said pulley portion removably to said base portion 94' by inserting said spring member through spaced axial bores in said base portion and matching bore 95' located between said spaced bores. A bar-like upper portion 98 prevents the fishing line 24 from popping off of said pulley portion 96, in use.

While there is here shown and described specific embodiments of this invention, the latter is not limited to the exact details of construction set forth, and the invention embraces such changes, modifications and equivalents of the parts and their formation and arrangement as come within the purviews of the appended claims.

What is claimed is:

1. In a fishing reel apparatus having a reel spool for reeling in the fishing line, a combination mounting and pole structure arrangement for said fishing reel apparatus, comprising, means for rotatably mounting said reel spool including a reel spool bearing and pedestal portion having lateral side walls, a front wall, a rear wall and a bottom wall, a reel base member including a mounting support portion of generally rectangular outline having end walls, forward and back walls, a bottom wall, and a top wall, a pair of pillow block-like bearing portions connected to said top wall having inside vertical faces and generally co-extensive with and abutting said lateral side walls of said pedestal portion, said pedestal portion and said pillow block-like portions having registering bores, an elongated fishing rod member journaled in said bores for extension outwardly therefrom for use as a fishing rod, said rod member having a plurality of transverse stop indentations as indexing members defined as bores spaced along its length, an indexing means, including an index pin finger mounted on said base member and a cantilever spring member connected to said index pin for selectively engaging said rod bores to adjust the length of said rod member in relationship to said base member, said rod member solely securing said pedestal portion to said base member while said rod member is in place in said pedestal and pillow block bores, and a line ferrule secured at one end of said rod for fielding the line to spool.

* * * * *